US012794346B2

(12) United States Patent
Wei et al.

(10) Patent No.: US 12,794,346 B2
(45) Date of Patent: Nov. 10, 2026

(54) DC-DC CONVERTER WITH REFERENCE FREQUENCY LOCKED MODULATION AND CONTROL METHOD THEREOF

(71) Applicant: BravoTek Electronics Co., Ltd., Hsinchu County (TW)

(72) Inventors: Wei-Hsin Wei, Hsinchu County (TW); Yu-Yu Liao, Hsinchu County (TW); Wei-Lun Hsieh, Hsinchu County (TW)

(73) Assignee: BRAVOTEK ELECTRONICS CO., LTD., Hsinchu County (TW)

( * ) Notice: Subject to any disclaimer, the term of this patent is extended or adjusted under 35 U.S.C. 154(b) by 286 days.

(21) Appl. No.: 18/670,755

(22) Filed: May 22, 2024

(65) Prior Publication Data

US 2025/0364892 A1 Nov. 27, 2025

(51) Int. Cl.
*H02M 1/00* (2007.01)
*H02M 3/07* (2006.01)

(52) U.S. Cl.
CPC ........... *H02M 1/0095* (2021.05); *H02M 3/07* (2013.01)

(58) Field of Classification Search
CPC ............. H02M 1/0003; H02M 1/0009; H02M 1/0012; H02M 1/0016; H02M 1/0019; H02M 1/0025; H02M 1/0032; H02M 1/0035; H02M 1/0038; H02M 1/0095; H02M 1/14; H02M 1/15; H02M 3/02; H02M 3/04; H02M 3/06; H02M 3/07–078; H02M 3/135; H02M 3/137; H02M 3/155; H02M 3/156; H02M 3/1566; H02M 3/157; H02M 3/158; H02M 3/1582; H02M 3/1588
USPC ........ 323/222–226, 259, 266, 271–275, 280, 323/282–285, 351
See application file for complete search history.

(56) References Cited

U.S. PATENT DOCUMENTS

| | | | | |
|---|---|---|---|---|
| 7,595,624 B2 | 9/2009 | Tateishi et al. | | |
| 8,896,284 B2 | 11/2014 | Fan | | |
| 9,531,267 B2 | 12/2016 | Fan | | |
| 9,548,651 B2 | 1/2017 | Guo | | |
| 11,394,291 B2 | 7/2022 | Li | | |
| 2015/0280557 A1* | 10/2015 | Xue | H02M 3/156 | 323/271 |
| 2015/0326123 A1* | 11/2015 | Fukushima | H02M 3/156 | 323/271 |
| 2023/0299672 A1* | 9/2023 | Hsieh | H02M 1/0016 | 323/271 |

* cited by examiner

*Primary Examiner* — Thienvu V Tran
*Assistant Examiner* — Carlos O Rivera-Perez
(74) *Attorney, Agent, or Firm* — WPAT, PC

(57) ABSTRACT

The application provides a DC-DC converter and the control method thereof. A power stage converts input to output voltage. A FLM control circuit compares power stage's internal node voltage with a reference frequency signal to generate an FLM result. A candidate on-time is generated based on FLM result and a minimum on-time. A control logic generates on-time for controlling internal switches. The DC-DC converter operates in four load ranges. In a highest load range, a switching frequency is fixed. In a second highest load range, the switching frequency is decreased with decreasing load current. In a third highest load range, the switching frequency is fixed but the on-time is decreased with decreasing load current. In a lowest load range, the switching frequency is decreased with decreasing load current.

20 Claims, 7 Drawing Sheets

DC-DC CONVERTER WITH REFERENCE FREQUENCY LOCKED MODULATION AND CONTROL METHOD THEREOF

TECHNICAL FIELD

The disclosure relates in general to a direct-current (DC)-DC converter with reference frequency locked modulation and a control method thereof.

BACKGROUND

A DC-DC converter is used to convert direct current voltage from one level to another. The functions and importance of a DC-DC converter are as follows. (1) Power conversion efficiency: DC-DC converters can convert power from one voltage level to another with high efficiency. This means there is minimal energy loss during the conversion process, which helps improve the overall efficiency of the power system. (2) Power adaptation: In electronic devices, different components and modules often require different voltage levels to operate properly. DC-DC converters provide the appropriate voltage to each component, enabling them to function effectively. (3) Battery management: In mobile devices and battery-powered equipment, DC-DC converters manage the output voltage of the battery to ensure the device receives the necessary power and to maximize battery life. (4) System stability: Using DC-DC converters can ensure that the output voltage remains stable even when the input voltage fluctuates. This is crucial for many sensitive electronic devices and circuits, which require a constant power supply to operate normally. (5) Size and weight advantages: Compared to traditional linear regulators, DC-DC converters are typically smaller and lighter, which is particularly important in applications where space is limited or weight is a concern.

In summary, DC-DC converters play a crucial role in the design and operation of electronic devices. They provide essential functions for power management and energy conversion, enabling various applications to operate efficiently and stably.

Currently, AMOLED (Active-Matrix Organic Light-Emitting Diode) power chips use DC-DC converters to achieve good power efficiency. When displaying low gray scale images, the current driving the OLED is relatively low. However, if the operating voltage of the AMOLED (OVDD and OVSS) has insufficient ripple control, water ripple effects can occur.

To date, several prior technologies have attempted to reduce the water ripple effect in AMOLEDs. One conventional technique uses shorter Pulse Frequency Modulation (PFM) on-times or forces the DC-DC converter into Continuous Conduction Mode (CCM) to reduce output voltage ripple. Another conventional technique involves additionally using a low-dropout regulator (LDO) to suppress voltage ripple. However, both of these techniques lead to reduced power efficiency.

The cause of water ripple is the perturbation of the OLED driving current due to voltage ripple in OVDD or OVSS. If the frequency of the OVDD or OVSS voltage ripple is not synchronized with the screen scanning frequency, the perturbation of the OLED driving current will occur irregularly across the screen, resulting in water ripple effects.

If the voltage ripple of OVDD/OVSS at light load can be synchronized with the horizontal scanning signal HSYNC, the perturbation of the OLED driving current can also be synchronized with the HSYNC signal and thus become regular. This should allow the perturbation caused by OVDD/OVSS to shift from occurring anywhere on the screen to fixed positions. This fixed perturbation frequency, being higher than the visual persistence threshold, might go unnoticed. Alternatively, pixel compensation can be performed at these fixed perturbation positions to eliminate the effects of the disturbances.

However, traditional DC-DC converters, when aiming for high efficiency under light loads, operate the power circuit's switching transistors with a fixed on-time in Discontinuous Conduction Mode (DCM). The switching frequency decreases as the load current decreases, preventing synchronization with the horizontal scanning signal HSYNC.

Therefore, there needs a new control method for DC-DC converters that allows them to operate at light loads with switching frequencies that decrease to multiples (or a single multiple) of the HSYNC frequency as the load decreases. This method should start reducing the on-time to lock the switching frequency at a defined multiple (or single multiple) of the HSYNC frequency. Once the on-time is minimized, the switching frequency continues to decrease with the load. The term "minimized on-time" refers to the point at which the output voltage ripple of the DC-DC converter is sufficiently small to prevent water ripple effects on the panel.

SUMMARY

According to one embodiment, a DC-DC converter with frequency-lock modulation is provided. The DC-DC converter with frequency-lock modulation comprises: a power stage converting an input voltage into an output voltage; a frequency-lock modulation (FLM) control circuit coupled to the power stage, the FLM control circuit receiving and comparing an internal node voltage of the power stage with a reference frequency signal to generate an FLM result, the internal node voltage representing a switching frequency; an on-time generation circuit coupled to the FLM control circuit, the on-time generation circuit generating a candidate on-time based on the FLM result; a minimum on-time generation circuit generating a minimum on-time; and a control logic connected to the power stage, the on-time generation circuit, and the minimum on-time generation circuit for generating an on-time based on the candidate on-time, the minimum on-time used for controlling an internal switches of the power stage. In a first load range, the DC-DC converter operates in a first mode where the switching frequency of the internal node voltage remains fixed; in a second load range, the DC-DC converter operates in a second mode where the switching frequency gradually decreases as a load current decreases; in a third load range, the DC-DC converter operates in a third mode where the switching frequency is fixed but the on-time gradually decreases as the load current decreases; and in a fourth load range, the DC-DC converter operates in the second mode, and the switching frequency gradually decreases as the load current decreases. The load current in the first load range is higher than that in the second load range, the load current in the second load range is higher than that in the third load range, and the load current in the third load range is higher than that in the fourth load range.

According to another embodiment, a control method for a DC-DC converter is provided. The control method comprises: converting an input voltage into an output voltage by power stage; receiving and comparing an internal node voltage of the power stage with a reference frequency signal by a frequency-lock modulation (FLM) control circuit to generate an FLM result, the internal node voltage representing a switching frequency; generating a candidate on-time based on the FLM result by an on-time generation circuit; generating a minimum on-time; and generating by a control logic an on-time based on the candidate on-time, the minimum on-time used for controlling an internal switches of the power stage. In a first load range, the DC-DC converter operates in a first mode where the switching frequency of the internal node voltage remains fixed; in a second load range, the DC-DC converter operates in a second mode where the switching frequency gradually decreases as a load current decreases; in a third load range, the DC-DC converter operates in a third mode where the switching frequency is fixed but the on-time gradually decreases as the load current decreases; and in a fourth load range, the DC-DC converter operates in the second mode, and the switching frequency gradually decreases as the load current decreases. The load current in the first load range is higher than that in the second load range, the load current in the second load range is higher than that in the third load range, and the load current in the third load range is higher than that in the fourth load range.

Figure 1:
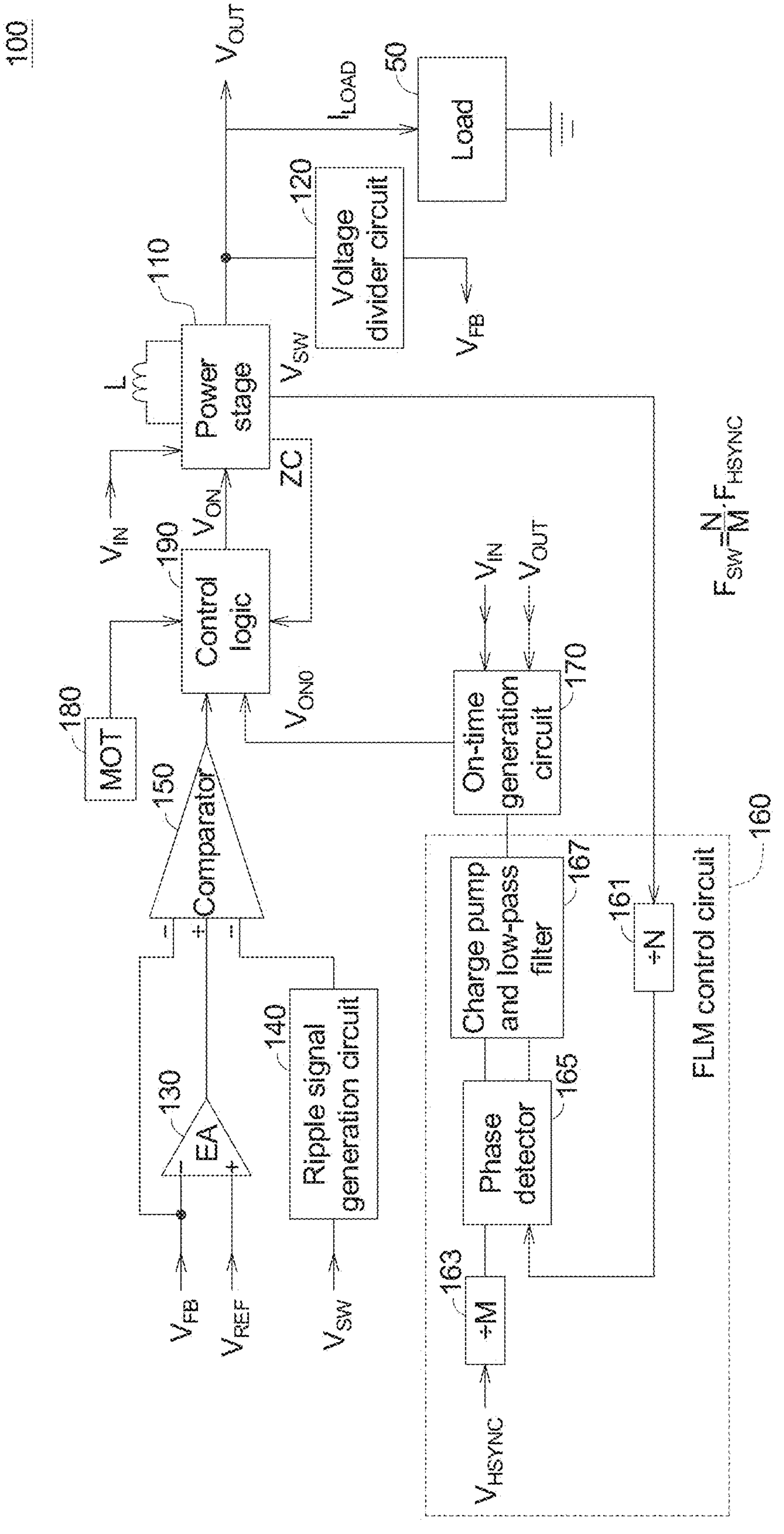
FIG. 1 illustrates a functional block diagram of a DC-DC converter with Reference Frequency Locked Modulation (FLM) according to an embodiment of this disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DESCRIPTION OF THE EMBODIMENTS

Technical terms of the disclosure are based on general definition in the technical field of the disclosure. If the disclosure describes or explains one or some terms, definition of the terms is based on the description or explanation of the disclosure. Each of the disclosed embodiments has one or more technical features. In possible implementation, one skilled person in the art would selectively implement part or all technical features of any embodiment of the disclosure or selectively combine part or all technical features of the embodiments of the disclosure.

One embodiment discloses a method for controlling the switch-on time and switching frequency of a DC-DC converter. The DC-DC converter has an input voltage and an output voltage. The control method includes: setting a switching frequency signal ($V_{SW}$) in Continuous Conduction Mode (CCM); setting a reference frequency signal ($V_{HSYNC}$) in Discontinuous Conduction Mode (DCM), where the reference frequency signal has a frequency lower than the rated switching frequency in the continuous conduction mode; a phase detector that detects the phase difference between the switching frequency signal and the reference frequency signal; a current generator that responds to the phase detection result from the phase detector to generate a current; an on-time generator that responds to the input voltage and output voltage, wherein when the DC-DC converter transitions from continuous conduction mode to discontinuous conduction mode, the on-time remains unchanged, causing the switching frequency to decrease as the load decreases; when the load further decreases, the on-time starts to reduce to maintain the switching frequency at or above the reference frequency signal; and control logic to ensure that the on-time always remains greater than or equal to a minimum on-time (generated by a minimum on-time generation circuit).

FIG. 1 illustrates a functional block diagram of a DC-DC converter with Reference Frequency Locked Modulation (FLM) according to an embodiment of this disclosure. The DC-DC converter 100 includes: a power stage 110, an inductor L, a voltage divider circuit 120, an error amplifier 130, a ripple signal generation circuit 140, a comparator 150, a frequency locked modulation (FLM) control circuit 160, an on-time generation circuit 170, a minimum on-time (MOT) generation circuit 180, and control logic 190. The frequency locked modulation control circuit 160 further includes: a first frequency divider 161, a second frequency divider 163, a phase detector 165, and a charge pump and low-pass filter 167. The DC-DC converter 100 provides a load current $I_{LOAD}$ to the load 50.

The power stage 110 converts the input voltage $V_{IN}$ into the output voltage $V_{OUT}$. When the DC-DC converter 100 is a DC-DC converter, both the input voltage $V_{IN}$ and the output voltage $V_{OUT}$ are DC voltages.

The inductor L is selectively connected across the power stage 110.

The voltage divider circuit 120 is coupled to the power stage 110. The voltage divider circuit 120 divides the output voltage $V_{OUT}$ into a feedback voltage $V_{FB}$.

The error amplifier 130 is coupled to the power stage 110 and/or the voltage divider circuit 120. The error amplifier 130 compares the feedback voltage $V_{FB}$ with the reference voltage $V_{REF}$ and generates an error amplification result.

The ripple signal generation circuit 140 is used to generate a ripple signal, which simulates the inductor ripple current signal.

The positive input terminal of the comparator 150 is coupled to the error amplifier 130. The first negative input terminal of the comparator 150 is coupled to the ripple signal generation circuit 140, and the second negative input terminal of the comparator 150 is coupled to the feedback voltage $V_{FB}$. The comparator 150 receives the error amplification result from the error amplifier 130, the ripple signal generated by the ripple signal generation circuit 140, and the feedback voltage VFB, to produce a comparison result. If the comparator result is true (i.e., if the voltage at the positive input terminal of the comparator 150 is higher than the sum of the voltages at the two negative input terminals of the comparator 150), then the comparison result from the comparator 150 triggers the control logic 190 to send a fixed on-time signal ($V_{ON}$) to the power stage 110, connecting one end of the inductor L to the input voltage $V_{IN}$ for inductor charging and energy storage. That is, the comparison result of the comparator 150 determines whether to trigger the control logic 190.

The frequency locked modulation control circuit 160 is coupled to the power stage 110. The frequency locked modulation control circuit 160 receives the internal node voltage $V_{SW}$ of the power stage 110 (which will be further explained below) to control a branch current ($I_X$, which will also be explained below) of the on-time generation circuit 170.

The first frequency divider 161 of the frequency locked modulation control circuit 160 divides the internal node voltage $V_{SW}$ of the power stage 110. The division factor of the first frequency divider 161 is N (N being a positive integer).

The second frequency divider 163 of the frequency locked modulation control circuit 160 divides a reference frequency signal $V_{HSYNC}$. The division factor of the second frequency divider 163 is M (M being a positive integer). The reference frequency signal $V_{HSYNC}$ is the horizontal sync signal.

The phase detector 165 of the frequency locked modulation control circuit 160 is coupled to the first frequency divider 161 and the second frequency divider 163, to receive the division results from both. The phase detector 165 detects the phase of the division result from the first frequency divider 161 and the phase of the division result from the second frequency divider 163, to produce a phase detection result.

The charge pump and low-pass filter 167 of the frequency locked modulation control circuit 160 are coupled to the phase detector 165. The charge pump and low-pass filter 167 generate a charge pump voltage ($V_{CP}$, which will be further explained below) based on the phase detection result from the phase detector 165.

Essentially, the phase detector 165 and the charge pump and low-pass filter 167 can be regarded as a conventional phase-locked loop (PLL). Therefore, the details are omitted here.

The on-time generation circuit 170 is coupled to the frequency locked modulation control circuit 160. The on-time generation circuit 170 produces a candidate on-time based on the input voltage and output voltage, as well as the FLM result from the frequency locked modulation control circuit 160.

The minimum on-time generation circuit 180 is used to produce a minimum on-time (MOT). The minimum on-time MOT is fixed.

The control logic 190 is coupled to the power stage 110, the comparator 150, the on-time generation circuit 170, and the minimum on-time generation circuit 180. When the comparison result from the comparator 150 is true, the control logic 190 sends a fixed on-time signal ($V_{ON}$) to the power stage 110, connecting one terminal of the inductor L to the input voltage $V_{IN}$ for inductor charging and energy storage. The control logic 190 selects the larger value between the candidate on-time $V_{ON0}$ from the on-time generation circuit 170 and the minimum on-time MOT from the minimum on-time generation circuit 180 to become the fixed on-time $V_{ON}$, and sends this fixed on-time $V_{ON}$ to the power stage 110. The zero inductor current detection result ZC from the power stage 110 is also input to the control logic 190, enabling the DC-DC converter 100 to operate in Discontinuous Conduction Mode (DCM).

Figure 2:
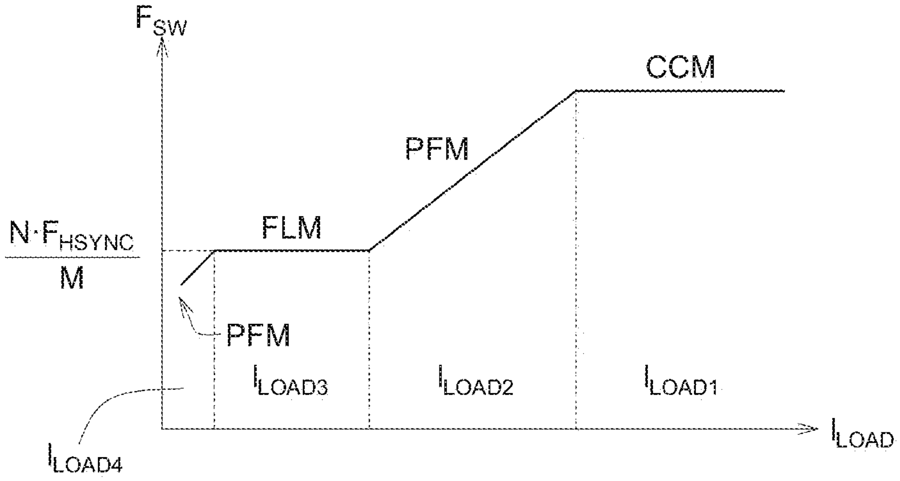
FIG. 2 shows a graph illustrating the relationship between the switching frequency and the load current of the DC-DC converter according to an embodiment of this disclosure.

FIG. 2 shows a graph illustrating the relationship between the switching frequency $F_{SW}$ and the load current $I_{LOAD}$ of the DC-DC converter 100 according to an embodiment of this disclosure. The switching frequency $F_{SW}$ refers to the switching frequency within the power stage 110.

As shown in FIG. 2, when the load current $I_{LOAD}$ is in the first load range $I_{LOAD1}$, the DC-DC converter 100 operates in CCM mode. In CCM mode, the switching frequency $F_{SW}$ remains fixed at a rated value.

When the load current $I_{LOAD}$ decreases from the first load range $I_{LOAD1}$ to the second load range $I_{LOAD2}$ (i.e., as the load of the DC-DC converter 100 gradually lightens), the DC-DC converter 100 operates in PFM mode. In this second load range, the switching frequency $F_{SW}$ gradually decreases as the load decreases.

When the load current $I_{LOAD}$ further decreases to the third load range $I_{LOAD3}$, the DC-DC converter 100 operates in FLM mode. In FLM mode, the switching frequency $F_{SW}$ is fixed at $F_{SW}=N*F_{HSYNC}/M$, but the on-time gradually shortens as the load current decreases.

When the on-time shortens to the minimum on-time MOT (or when the load current $I_{LOAD}$ decreases further to the fourth load range $I_{LOAD4}$), the DC-DC converter 100 operates again in PFM mode. In PFM mode, the switching frequency $F_{SW}$ gradually decreases as the load current decreases.

As seen in FIG. 2, from the first load range to the fourth load range, the load current in the first load range is greater than the load current in the second load range, the load current in the second load range is greater than the load current in the third range, and the load current in the third range is greater than the load current in the fourth load range.

Figure 3:
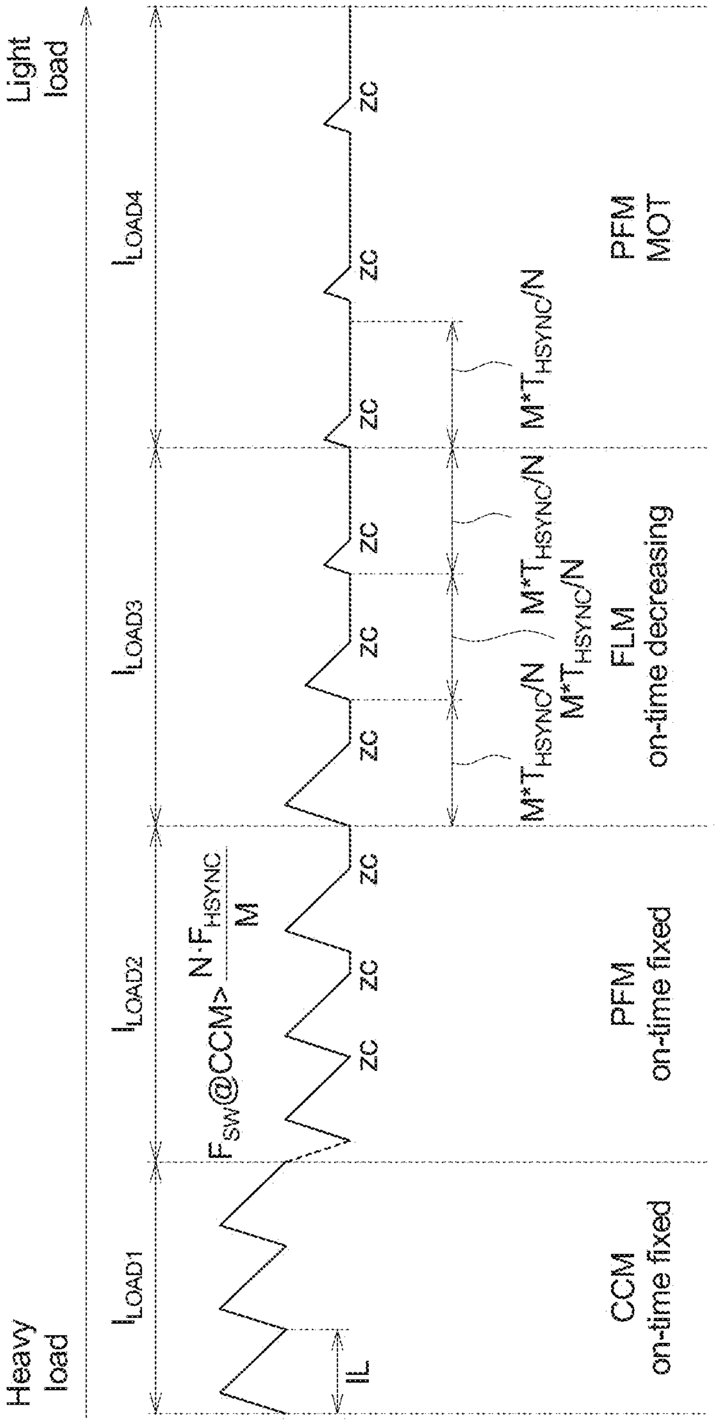
FIG. 3 shows a schematic diagram illustrating the variation of the inductor current of the DC-DC converter according to an embodiment of this disclosure.

FIG. 3 shows a schematic diagram illustrating the variation of the inductor current $I_L$ and the load current $I_{LOAD}$ of the DC-DC converter 100 according to an embodiment of this disclosure. FIG. 3 should be viewed in conjunction with FIG. 2.

In the first load range $I_{LOAD1}$, which represents a heavy load, the DC-DC converter 100 operates in CCM mode. In CCM mode, the switching frequency $F_{SW}$ remains fixed at a rated value, and the on-time remains unchanged.

In the second load range $I_{LOAD2}$, the switching frequency $F_{SW}$ ($F_{SW}$@CCM) is still greater than $N*F_{HSYNC}/M$ (where $F_{HSYNC}$ represents the frequency of the horizontal sync signal), and the DC-DC converter 100 operates in PFM mode. In PFM mode, the switching frequency $F_{SW}$ gradually decreases as the load decreases, but the on-time remains unchanged.

In the third load range $I_{LOAD3}$, the DC-DC converter 100 operates in FLM mode. In FLM mode, the switching frequency $F_{SW}$ is fixed ($T_{SW}=M*T_{HSYNC}/N$), but the on-time gradually shortens, where $T_{SW}$ represents the cycle of the switching frequency $F_{SW}$, and $T_{HSYNC}$ is the cycle of the horizontal sync signal.

In the fourth load range $I_{LOAD4}$, when the on-time shortens to the minimum on-time MOT, the DC-DC converter 100 operates again in PFM mode. In PFM mode, the switching frequency $F_{SW}$ gradually decreases as the load decreases.

Figure 4:
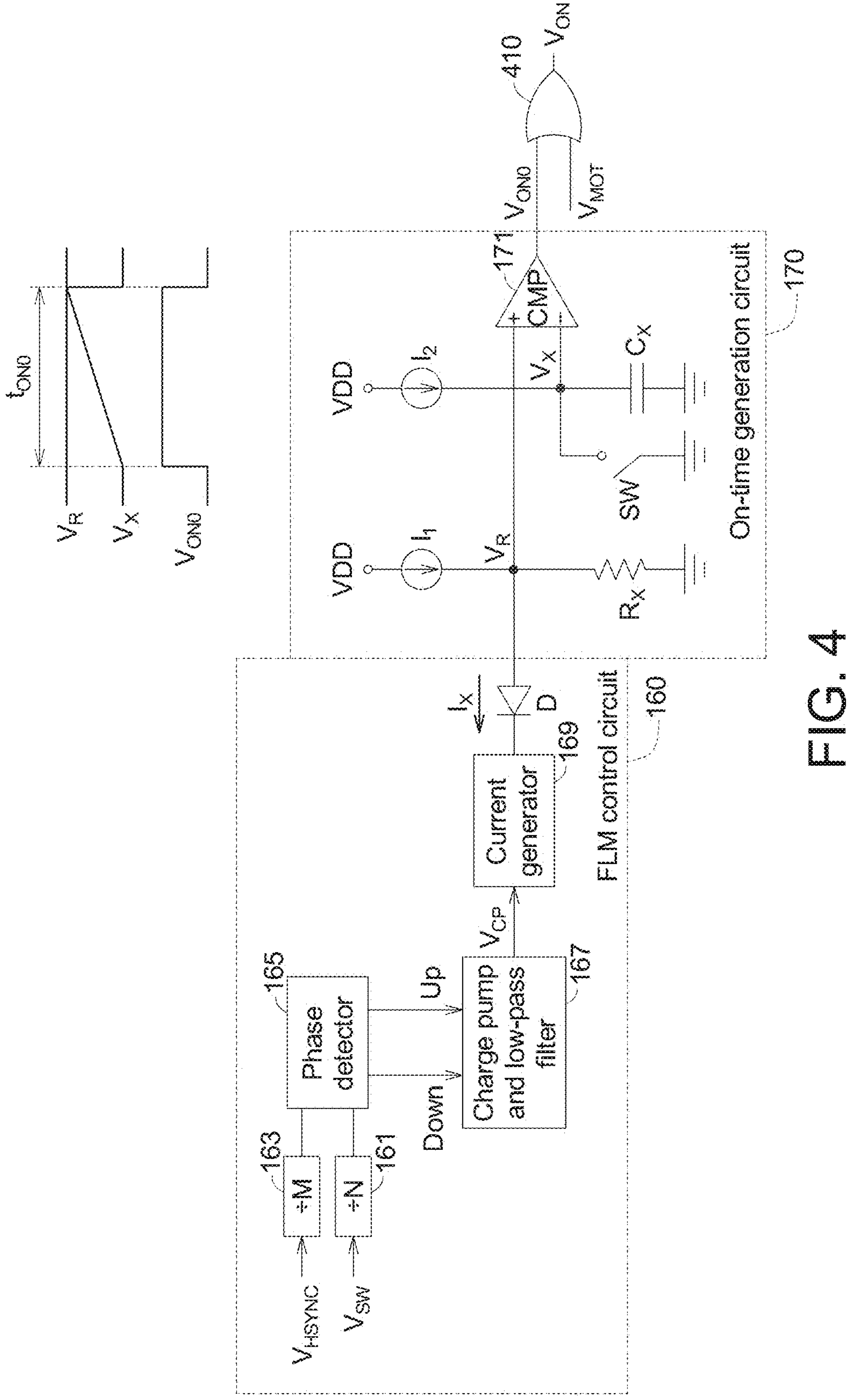
FIG. 4 shows a schematic diagram illustrating how the on-time is generated according to an embodiment of this disclosure.

FIG. 4 shows a schematic diagram illustrating how the on-time is generated according to an embodiment of this disclosure. The frequency-locked modulation control circuit 160 further includes a current generator 169 coupled to the charge pump and low-pass filter 167 for converting the charge pump voltage $V_{CP}$ generated by the charge pump and low-pass filter 167 into a current to prevent the diode D in the frequency-locked modulation control circuit 160 from reverse conduction (i.e., in FIG. 4, the branch current $I_X$ is either 0 or greater than 0, and the branch current $I_X$ is never negative). Specifically, when the branch current $I_X$ is 0, the candidate on-time $t_{ON0}$ is at the maximum value; when the branch current $I_X$ gradually increases (above 0), the candidate on-time $t_{ON0}$ gradually decreases. In other words, the frequency-locked modulation control circuit 160 generates different candidate on-times $t_{ON0}$ by controlling the value of the branch current $I_X$.

The on-time generation circuit 170 includes: current sources $I_1$ and $I_2$, a resistor $R_X$, a capacitor $C_X$, a switch SW, and a comparator 171.

The current sources $I_1$ and $I_2$ provide reference currents $I_1$ and $I_2$, respectively.

The resistor $R_X$ is coupled to the current source I1. The node voltage $V_R$ can be expressed as: $V_R=(I_1-I_X)*R_X$.

The capacitor $C_X$ is coupled to the current source $I_2$.

The switch SW is coupled to the capacitor $C_X$. When the switch SW is on, the capacitor $C_X$ is discharged, making the node voltage $V_X$ equal to 0.

The comparator 171 compares the node voltages $V_R$ and $V_X$ to generate the candidate on-time voltage $V_{ON0}$ corresponding to the candidate on-time $t_{ON0}$.

A logic gate 410 (e.g., an OR gate) receives the candidate on-time voltage $V_{ON0}$ and the minimum on-time voltage $V_{MOT}$ generated by the minimum on-time generation circuit 180 to produce the on-time voltage $V_{ON}$, where the minimum on-time voltage $V_{MOT}$ corresponds to the minimum on-time MOT, and the on-time voltage $V_{ON}$ corresponds to the on-time $T_{ON}$. When the candidate on-time voltage $V_{ON0}$ is greater than or equal to the minimum on-time voltage $V_{MOT}$, the logic gate 410 selects the candidate on-time voltage VON0 as the on-time voltage $V_{ON}$; when the candidate on-time voltage VON0 is less than the minimum on-time voltage $V_{MOT}$, the logic gate 410 selects the minimum on-time voltage $V_{MOT}$ as the on-time voltage $V_{ON}$. The logic gate 410 is located within the control logic 190.

The details of generating the on-time will now be explained.

The followings are equations (1)-(4).

$$C_X^* R_X = I_2^* t_{ON0} \quad (1)$$

$$V_R = (I_1 - I_X)^* R_X \quad (2)$$

$$t_{ON0} = R_X^* C_X^* (I_1 - I_X)/I_2 \quad (3)$$

$$t_{ON0} = R_X^* C_X^* (I_1(V_{IN}, V_{OUT}) - I_X)/I_2(V_{IN}, V_{OUT}) \quad (4)$$

In equation (1), during the candidate on-time, the charging amount to the capacitor $C_X$ by the current source $I_2$ is equal to $C_X*V_R$, when the voltages at the two input terminals of the comparator 171 are equal.

Equation (2) represents the voltage at node $V_R$.

Substituting equation (2) into equation (1) yields equation (3).

As for equation (4), it represents the currents $I_1$ and 12 as functions of the input voltage $V_{IN}$ and the output voltage $V_{OUT}$. $I_1(V_{IN}, V_{OUT})-I_X)/I_2(V_{IN}, V_{OUT})$.

First, assume the branch current $I_X=0$. From equation (3), it can be understood that the candidate on-time $t_{ON0}$ depends only on the input voltage $V_{IN}$, the output voltage $V_{OUT}$, the resistor $R_X$ and the capacitor $C_X$. This candidate on-time $t_{ON0}$ is designed to allow the DC-DC converter 100 to operate at a fixed frequency in CCM mode.

When the divided result ($V_{SW}$/N) of the desired switching frequency signal ($V_{SW}$) is lower than the divided result ($V_{HSYNC}$/M) of the reference frequency signal ($V_{HSYNC}$), then the phase detector 165, along with the charge pump and low-pass filter 167, will slightly increase the charge pump voltage $V_{CP}$, causing the branch current $I_X$ to be higher. In this case, the candidate on-time $t_{ON0}$ is reduced to lock the switching frequency $F_{SW}$.

The on-time $t_{ON0}$ is the duty cycle of the on-time voltage $V_{ON}$.

In other words, at the initial operation, $I_X=0$, the current source $I_1$ charges the resistor $R_X$ to get $V_R=I_R*R_X$. Meanwhile, the switch SW is on to discharge the node $V_X$ to 0V, and the current source $I_2$ charges the capacitor $C_X$. When the node voltage $V_R$ is higher than the node voltage $V_X$, the comparator 171 produces a high-level $V_{ON0}$. $V_{ON0}$ remains high until $V_R=V_X$.

Assuming $I_X=0$, $R_X$, $C_X$, $I_1$ and $I_2$ are adjusted according to the $t_{ON0}$ equation to keep the frequency of $t_{ON0}$.

As $I_X$ is larger, $t_{ON0}$ decreases. Due to the diode D, the branch current $I_X$ is never negative.

In CCM mode, when the switching voltage $V_{SW}$ has a frequency higher than the horizontal scan signal $V_{HSYNC}$, the charge pump and low-pass filter 167 will decrease the charge pump voltage $V_{CP}$. When the charge pump voltage $V_{CP}$ drops to its minimum, the branch current $I_X=0$ and the candidate on-time voltage VON0 remains unaffected, maintaining the original on-time.

In the second load range $I_{LOAD2}$ shown in FIG. 3, the frequency of the switching voltage $V_{SW}$ decreases as the load decreases (i.e., the switching frequency $F_{SW}$ decreases). When the divided result ($V_{SW}$/N) of the desired switching frequency ($V_{SW}$) is lower than the divided result ($V_{HSYNC}$/M) of the reference frequency signal ($V_{HSYNC}$), the charge pump and low-pass filter 167 begin to increase the charge pump voltage $V_{CP}$. Consequently, the branch current $I_X$ starts to exceed 0. In this scenario, the on-time decreases as the load current decreases (entering the third load range $I_{LOAD3}$ shown in FIG. 3), until the on-time is less than or equal to the minimum on-time ($t_{ON0} \le t_{MOT}$) and entering the fourth load range $I_{LOAD4}$ in FIG. 3. When the load current continues to decrease, the switching frequency $F_{SW}$ also decreases accordingly.

FIGS. 5A to 5D respectively show several examples of the power stage.

Figure 5A:
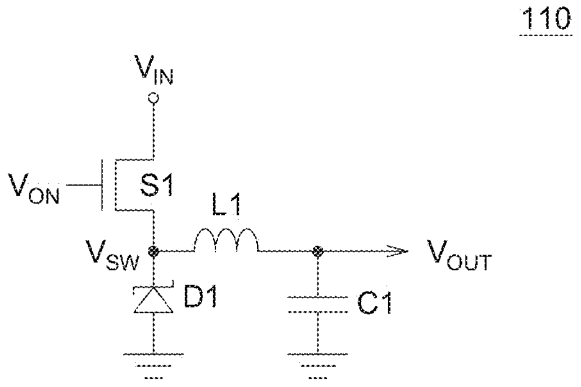
FIGS. 5A to 5D respectively show several examples of the power stage.

As shown in FIG. 5A, the power stage 110 includes: a switch S1, a Schottky diode D1, an inductor L1 and a capacitor C1. The power stage 110 in FIG. 5A is a buck-type power stage.

Figure 5B:
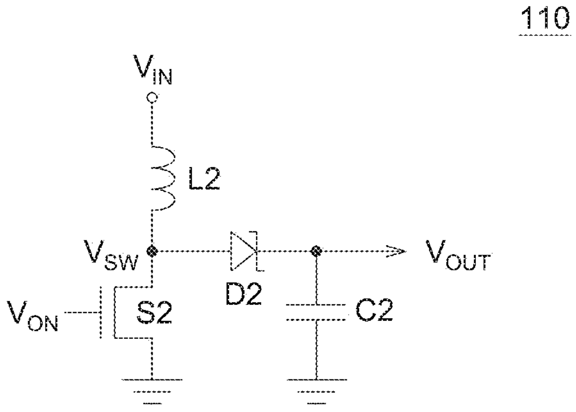

As shown in FIG. 5B, the power stage 110 includes: a switch S2, a Schottky diode D2, an inductor L2, and a capacitor C2. The power stage 110 in FIG. 5B is a boost-type power stage.

Figure 5C:
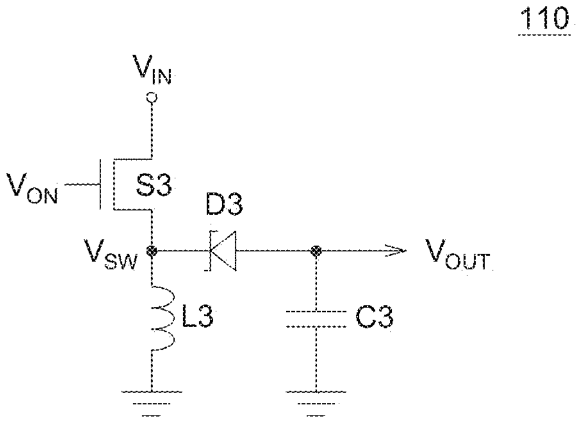

As depicted in FIG. 5C, the power stage 110 includes a switch S3, a Schottky diode D3, an inductor L3, and a capacitor C3. The power stage 110 in FIG. 5C is an inverting-type power stage.

Figure 5D:
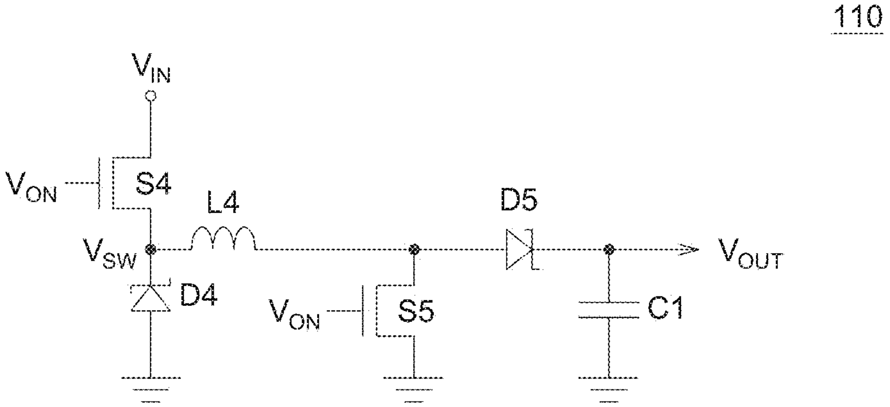

As illustrated in FIG. 5D, the power stage 110 comprises: switches S4 and S5, Schottky diodes D4 and D5, an inductor L4, and a capacitor C4. The power stage 110 in FIG. 5D is a buck-boost-type power stage.

The details of FIGS. 5A to 5D are not specifically described here.

The power stage 110 is not limited to the embodiments depicted in FIGS. 5A to 5D. Although FIGS. 5A to 5D show asynchronous power stages, other embodiments of the present invention may also use synchronous power stages (replacing Schottky diodes with power switches), all within the scope of the present invention.

Figure 6:
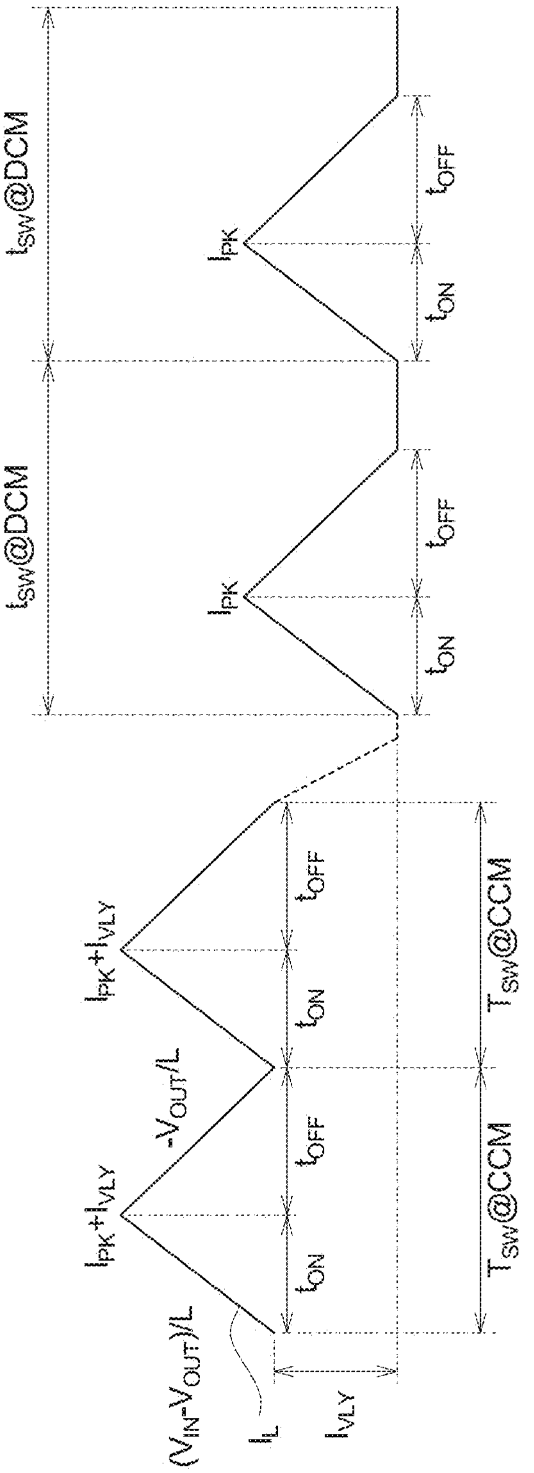
FIG. 6 illustrates a schematic diagram of the inductor current according to one embodiment of the present invention.

FIG. 6 illustrates a schematic diagram of the inductor current $I_L$ according to one embodiment of the present invention. Here, the explanation is based on the assumption that the power stage 110 is a synchronous buck power stage. In FIG. 6, the power stage 110 operates in CCM mode during the first two cycles, while operates in DCM mode during the next two cycles. $I_{PK}$ refers to the peak value of the inductor current $I_L$.

From FIG. 6, it can be derived that the peak value $I_{PK}$ of the inductor current $I_L$ can be expressed in equation (5) using the on-time $t_{ON}$ and off-time $t_{OFF}$ (where $t_{OFF}$ refers to the off-time of the internal switches of the buck power stage).

$$I_{PK} = \frac{V_{IN} - V_{OUT}}{L} \cdot t_{ON} = \frac{V_{OUT}}{L} \cdot t_{OFF} \tag{5}$$

From equation (5), the relationship between the on-time $t_{ON}$ and off-time $t_{OFF}$ can be derived as shown in equation (6).

$$t_{OFF} = \frac{V_{IN} - V_{OUT}}{V_{OUT}} \cdot t_{ON} \tag{6}$$

$Q_0$ represents the charge accumulated in the inductor L during the on-time $t_{ON}$, which can be expressed as shown in equation (7).

$$Q_O = \int_0^{t_{ON}} \left(I_{VLY} + \frac{V_{IN} - V_{OUT}}{L} \cdot t\right) dt + \int_0^{t_{OFF}} \left(I_{VLY} + I_{PK} - \frac{V_{OUT}}{L} \cdot t\right) dt = \frac{V_{IN}}{V_{OUT}} \cdot \left(I_{VLY} + \frac{V_{IN} - V_{OUT}}{L} t_{ON}\right) \cdot t_{ON} \tag{7}$$

When operating in CCM, the output current is as $$I_{O@CCM} = \frac{Q_o}{T_{SW@CCM}} = F_{SW@CCM} \cdot \frac{V_{IN}}{V_{OUT}} \cdot \left(I_{VLY} + \frac{V_{IN} - V_{OUT}}{L} t_{ON}\right) \cdot t_{ON}.$$

When operating in DCM, the output current is as $$I_{O@DCM} = \frac{Q_o}{T_{SW@DCM}} = f_{SW@DCM} \cdot \frac{V_{IN}}{V_{OUT}} \cdot \frac{V_{IN} - V_{OUT}}{L} \cdot t_{ON}^2.$$

In PFM mode, the on-time $t_{ON}$ is fixed, and the switching frequency $F_{SW}$ is changed to obtain the output current.

In FLM mode, the switching frequency $F_{SW}$ is fixed, but the on-time $t_{ON}$ is shortened to obtain the output current.

In conventional techniques, traditional DC-DC converters operate the power switch with a fixed on-time at light loads. As the load decreases, the switching frequency also decreases, causing it to be out of sync with the horizontal sync signal $V_{HSYNC}$, resulting in undesirable effects such as ripple generation.

Therefore, in one embodiment of the present invention, as the load decreases, the switching frequency decreases to a multiple frequency (or single frequency) of the horizontal sync signal $V_{HSYNC}$, and then the on-time is reduced. Through this method, the switching frequency of the DC-DC converter can synchronize with a multiple frequency (or single frequency) of the horizontal sync signal $V_{HSYNC}$ until the on-time is minimized, and then the switching frequency decreases as the load decreases. The "minimum on-time" refers to the point where the output voltage ripple of the DC-DC converter is small enough not to produce visible ripples on the panel.

While this document may describe many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination in some cases can be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A DC-DC converter with frequency-lock modulation, comprising:

a power stage converting an input voltage into an output voltage;

a frequency-lock modulation (FLM) control circuit coupled to the power stage, the FLM control circuit receiving and comparing an internal node voltage of the power stage with a reference frequency signal having a reference frequency to generate an FLM result, the internal node voltage representing a switching frequency;

an on-time generation circuit coupled to the FLM control circuit, the on-time generation circuit generating a candidate on-time based on the FLM result;

a minimum on-time generation circuit generating a minimum on-time; and a control logic connected to the power stage, the on-time generation circuit, and the minimum on-time generation circuit for generating an on-time based on the candidate on-time and the minimum on-time, the on-time being used for controlling internal switches of the power stage, wherein in a first load range, the DC-DC converter operates in a first mode where the switching frequency of the internal node voltage remains fixed;

in a second load range, the DC-DC converter operates in a second mode in which the on-time remains the same as that in the first load range, where the switching frequency gradually decreases as a load current decreases;

in a third load range, the DC-DC converter operates in a third mode where the switching frequency is fixed and the on-time gradually decreases as the load current decreases; and in a fourth load range, the DC-DC converter operates in the second mode, and the switching frequency gradually decreases as the load current decreases;

the load current in the first load range is higher than that in the second load range, the load current in the second load range is higher than that in the third load range, and the load current in the third load range is higher than that in the fourth load range.

2. The DC-DC converter of claim 1, further comprising:

a voltage divider circuit coupled to the power stage for dividing the output voltage to provide a feedback voltage;

an error amplifier coupled to the power stage and the voltage divider circuit for comparing the feedback voltage with a reference voltage and generating an error amplification result;

a ripple signal generation circuit generating a ripple signal; and a comparator coupled to the error amplifier, the ripple signal generation circuit, and the control logic, the comparator receiving the error amplification result, the ripple signal, and the feedback voltage to generate a comparison result, the comparison result being input to the control logic.

3. The DC-DC converter of claim 2, wherein the frequency-lock modulation control circuit includes:

a first frequency divider coupled to the power stage, dividing a frequency of the internal node voltage of the power stage to generate a first division result;

a second frequency divider dividing the reference frequency of the reference frequency signal to generate a second division result;

a phase detector coupled to the first and second frequency dividers, detecting phases of the first division result and the second division result to generate a phase detection result;

a charge pump and low-pass filter coupled to the phase detector to generate a charge pump voltage; and a current generator coupled to the charge pump and low-pass filter to convert the charge pump voltage into a current, the candidate on-time being adjusted based on the current.

4. The DC-DC converter of claim 3, wherein the current generated by the current generator controls a branch current of the on-time generation circuit;

when the branch current is 0, the candidate on-time is a maximum value; and as the branch current increases, the candidate on-time decreases gradually.

5. The DC-DC converter of claim 1, wherein the first mode is a continuous conduction mode (CCM), the second mode is a pulse frequency modulation mode (PFM), and the third mode is a frequency-lock modulation mode (FLM);

wherein in the second mode corresponding to the second load range, when the switching frequency reaches a predetermined frequency corresponding to the reference frequency or a multiple of the reference frequency, the DC-DC converter enters the third mode and operates according to the FLM result, such that the switching frequency is locked at the predetermined frequency.

6. The DC-DC converter of claim 5, wherein in the third load range, when the on-time is limited by the minimum on-time, or when the on-time reaches the minimum on-time, the DC-DC converter enters the second mode corresponding to the fourth load range, and the on-time is maintained at the minimum on-time.

7. The DC-DC converter of claim 6, wherein the control logic is configured to select the candidate on-time as the on-time when the candidate on-time is greater than the minimum on-time, and to select the minimum on-time as the on-time when the candidate on-time is less than the minimum on-time.

8. The DC-DC converter of claim 6, wherein the DC-DC converter is configured to supply the output voltage as an operating voltage of an AMOLED display panel which is driven according to a horizontal scanning signal having a horizontal scanning frequency for controlling horizontal scanning of the AMOLED display panel, wherein the reference frequency signal corresponds to the horizontal scanning signal and the reference frequency corresponds to the horizontal scanning frequency;

wherein in the third mode, the switching frequency is locked at the predetermined frequency and is synchronized with the horizontal scanning frequency or a multiple of the horizontal scanning frequency.

9. The DC-DC converter of claim 8, wherein the AMOLED display panel is driven by an AMOLED driving current, wherein a perturbation of the AMOLED driving current due to a ripple of the output voltage occurs at fixed positions on the AMOLED display panel by synchronizing the switching frequency to the horizontal scanning frequency or a multiple of the horizontal scanning frequency, thereby reducing water ripple effects on the AMOLED display panel.

10. The DC-DC converter of claim 8, wherein the minimum on-time corresponds to a point at which a ripple of the output voltage is sufficiently small to prevent water ripple effects on the AMOLED display panel.

11. A control method for a DC-DC converter, the control method comprising:

converting an input voltage into an output voltage by a power stage;

receiving and comparing an internal node voltage of the power stage with a reference frequency signal having a reference frequency by a frequency-lock modulation (FLM) control circuit to generate an FLM result, the internal node voltage representing a switching frequency;

generating a candidate on-time based on the FLM result by an on-time generation circuit;

generating a minimum on-time; and generating by a control logic an on-time based on the candidate on-time and the minimum on-time, the on-time being used for controlling internal switches of the power stage, wherein in a first load range, the DC-DC converter operates in a first mode where the switching frequency of the internal node voltage remains fixed;

in a second load range, the DC-DC converter operates in a second mode in which the on-time remains the same as that in the first load range, where the switching frequency gradually decreases as a load current decreases;

in a third load range, the DC-DC converter operates in a third mode where the switching frequency is fixed and the on-time gradually decreases as the load current decreases; and in a fourth load range, the DC-DC converter operates in the second mode, and the switching frequency gradually decreases as the load current decreases;

the load current in the first load range is higher than that in the second load range, the load current in the second load range is higher than that in the third load range, and the load current in the third load range is higher than that in the fourth load range.

12. The control method of claim 11, further comprising:

dividing the output voltage to provide a feedback voltage;

comparing the feedback voltage with a reference voltage and generating an error amplification result;

generating a ripple signal; and receiving the error amplification result, the ripple signal, and the feedback voltage to generate a comparison result, the comparison result input to the control logic.

13. The control method of claim 12, further comprising:

dividing a frequency of the internal node voltage of the power stage to generate a first division result;

dividing the reference frequency of the reference frequency signal to generate a second division result;

detecting phases of the first division result and the second division result to generate a phase detection result;

generating a charge pump voltage; and converting the charge pump voltage into a current, the candidate on-time being adjusted based on the current.

14. The control method of claim 13, wherein the current generated by converting the charge pump voltage controls a branch current;

when the branch current is 0, the candidate on-time is a maximum value; and as the branch current increases, the candidate on-time decreases gradually.

15. The control method of claim 11, wherein the first mode is a continuous conduction mode (CCM), the second mode is a pulse frequency modulation mode (PFM), and the third mode is a frequency-lock modulation mode (FLM), wherein in the second mode corresponding to the second load range, when the switching frequency reaches a predetermined frequency corresponding to the reference frequency or a multiple of the reference frequency, the DC-DC converter enters the third mode and operates according to the FLM result, such that the switching frequency is locked at the predetermined frequency.

16. The control method of claim 15, wherein in the third load range, when the on-time is limited by the minimum on-time, or when the on-time reaches the minimum on-time, the DC-DC converter enters the second mode corresponding to the fourth load range, and the on-time is maintained at the minimum on-time.

17. The control method of claim 16, wherein generating the on-time includes:

selecting the candidate on-time as the on-time when the candidate on-time is greater than the minimum on-time; and selecting the minimum on-time as the on-time when the candidate on-time is less than the minimum on-time.

18. The control method of claim 16, wherein the output voltage is supplied as an operating voltage of an AMOLED display panel which is driven according to a horizontal scanning signal having a horizontal scanning frequency for controlling horizontal scanning of the AMOLED display panel, wherein the reference frequency signal corresponds to the horizontal scanning signal and the reference frequency corresponds to the horizontal scanning frequency;

wherein in the third mode, the switching frequency is locked at the predetermined frequency and is synchronized with the horizontal scanning frequency or a multiple of the horizontal scanning frequency.

19. The control method of claim 18, wherein the AMOLED display panel is driven by an AMOLED driving current, wherein a perturbation of the AMOLED driving current due to a ripple of the output voltage occurs at fixed positions on the AMOLED display panel by synchronizing the switching frequency to the horizontal scanning frequency or a multiple of the horizontal scanning frequency, thereby reducing water ripple effects on the AMOLED display panel.

20. The control method of claim 18, wherein the minimum on-time corresponds to a point at which a ripple of the output voltage is sufficiently small to prevent water ripple effects on the AMOLED display panel.

* * * * *